Sept. 16, 1930.  A. Y. PEARL  1,775,691
ORNAMENTAL COATING OR FILM AND PROCESS OF MAKING SAME
Filed July 2, 1926  6 Sheets-Sheet 1

Inventor:
Azariah Y. Pearl,
by Richos Brown Dunley May
attys.

Sept. 16, 1930.  A. Y. PEARL  1,775,691
ORNAMENTAL COATING OR FILM AND PROCESS OF MAKING SAME
Filed July 2, 1926   6 Sheets-Sheet 5

Patented Sept. 16, 1930

1,775,691

UNITED STATES PATENT OFFICE

AZARIAH Y. PEARL, OF WINDSOR, VERMONT, ASSIGNOR TO LABORATOIRES SÉVIGNÉ-PEARL, INC., OF WINDSOR, VERMONT, A CORPORATION OF VERMONT

ORNAMENTAL COATING OR FILM AND PROCESS OF MAKING SAME

Application filed July 2, 1926. Serial No. 120,196.

This invention relates to ornamental coatings or films composed of a coating composition such as a cellulose derivative, and more particularly nitrocellulose, and a method of and machine for making the same.

The coating may be made on any suitable surface or base, such as paper, cloth, leather, or the like, in which case it becomes partially embedded in and tenaciously grips the base. When made on a smooth, impermeable base, such as glass, metal, or the like, it may subsequently be stripped in the form of a continuous, coherent film.

In accordance with the present invention, nitrocellulose, and a suitable crystallizable compound sublimable or vaporizable below the decomposition temperature of nitrocellulose, are dissolved in proper proportion in a common solvent, together, if desired, with a coloring agent or dye. The solution is then applied in the form of a thin coating to a suitable base, preferably at a temperature sufficiently low to prevent rapid evaporation of the solvent. Upon evaporation of the solvent, the coating sets and the crystallizable compound crystallizes within and throughout the entire coating. The product is then treated to remove the crystals, for example it being heated or cured to about the subliming or vaporizing temperature of the crystals entrapped therewithin, so that they are released and expelled, leaving behind in intaglio in the coating their natural design or configuration. A coating thus made, although composed of nitrocellulose, presents a remarkably realistic crystalline appearance and makes possible the production of many very beautiful effects, especially when crystallizable compounds forming radiating crystals are employed. The coating possesses a beautiful silky or satiny appearance and also is highly light-reflective or lustrous. The crystalline appearance may be attributed to the fact that the coating reflects and refracts light in a manner similar to the crystals which have been expelled, giving light and shadow effects corresponding to the light and shadow effects of crystals. By varying the type of crystal employed, the concentration of crystal in solution, the conditions of crystallization, and the coloring agent, the appearance of the product may be varied.

A coating or film such as hereinbefore described not only is highly attractive, but is waterproof, greaseproof, flexible, and possesses other characteristics incident to the usual nitrocellulose coating or film. The coloring of the coating or film, moreover, is not affected by water, owing to the fact that the color is retained in the water-impervious nitrocellulose. Hence the colored material may be washed or cleaned without deleterious effect. It may be applied to sheet material, e. g., paper, to produce a highly attractive product suitable for use as wall paper, for candy box manufacture, or for other decorative uses.

The present invention is also concerned with a continuous method of and machine for forming such a coating on sheet material, such as paper. A thin coating is evenly distributed over the paper, and the crystals subsequently formed therein are liberated to produce a crystalline configured intaglio. The machine of the present invention, therefore, comprises a coating device which applies and distributes a layer of predetermined thickness over the paper. The device includes a box having a series of gates through which the solution flows as a continuous layer over the paper which progresses at predetermined rate thereunder. The device further includes an adjustable doctor which distributes the coating material evenly over the paper.

The coated paper is maintained in a room at relatively low temperature during crystallization. After crystallization, the paper is cured in a room at a temperature sufficiently high to liberate the crystals, but below the temperature of decomposition of the nitrocellulose.

With these and other objects in view, the invention consists in certain novel features of procedure, as well as of construction, combinations and arrangements of parts, as will be more fully hereinafter described in conjunction with the accompanying drawings, wherein Figure A shows in perspective a fragment of coated paper.

Figure B illustrates in enlarged plan view a fragment of the paper.

Figure C is a highly magnified section through the paper.

Figure 1ª similarly represents a side view of the hot room end of the machine and shows the paper as it passes into the hot room from the cold room.

Figure 3 illustrates an end view of the cold room, showing auxiliary apparatus and piping for the coating device.

The nitrocellulose or nitrocotton employed as a raw material may be of low nitration, similar to that employed in the manufacture of artificial silk, and may contain, for example, 11% to 13% nitrogen. When dissolved, the viscosity of the resulting solution depends upon the character of the nitrocotton. Inasmuch as evaporation of solvent takes place more quickly from a solution of low viscosity, and a coating or film producing better sheen is produced, the nitrocotton is preferably approximately "four-second" lacquer cotton. If nitrocotton producing solutions of high viscosity are employed, a "padded" crystalline appearance results.

One of the most satisfactory crystallizable compounds which possesses the desired physical and chemical characteristics has been found to be monobrom-camphor, which forms long, radiating, monoclinic crystals, subliming at 76° C. Other crystallizable compounds may be employed, however, such as salicylic acid, benzoic acid, resorcinol, borneol, terpene hydrate, menthol and thymol. Certain of these compounds which possess certain features of advantage over monobrom-camphor are less desirable in other respects. Thus, salicylic acid is an odorless, relatively cheap compound, but its crystals are not so large or well defined as those of monobrom-camphor. Certain other compounds, such as menthol and thymol, would be too expensive ordinarily for commercial use.

The solvent may be any suitable volatile solvent which effects a solution of both the nitrocellulose and the crystallizable compound. A common solvent may, for example, be "straight" acetone, an alcohol-ether mixture, amyl acetate, butyl alcohol, a mixture of benzol and ethyl acetate, or other solvents or mixture of solvents. A relatively cheap solvent, known as "solvent L" in the trade, has been successfully utilized. This solvent contains approximately 40% to 50% methyl acetone, 20% to 30% methyl acetate, and 30% methyl alcohol, and possesses the advantage of being highly volatile, boiling at 54° to 57° C. A suitable dye or lake may be added to the solution. The coating or film may, however, be colored after it has been formed. I may, for example, add Victoria blue to the solution, or a soluble dye of any other desired color.

As a specific example of procedure which may be followed in producing the solution, the following will suffice. About 14 pounds of nitrocotton and 20 pounds of monobrom-camphor are mixed, with stirring, into about 25 gallons of solvent L until a complete solution of the material has been effected. The resulting solution has a consistency or viscosity of about that of honey. The solution is applied in the form of a thin coating to the base and the solvent is then allowed to evaporate at relatively low temperature, whereupon a setting of the coating and a crystallization of the brom-camphor takes place. The product is then heated to a temperature sufficiently high to liberate the brom-camphor crystals, but below the temperature of decomposition of the nitrocellulose.

The cured coating, as shown in Figure A, is continuous and is composed of radiating, crystal-simulating clusters $c$ of various sizes, which lie adjacent to one another and are bounded by well-defined lines $l$. Each radiating, crystal-simulating cluster $c$ may have an appearance similar to that of the grain of a transverse section through wood, and may be composed of rings $d$ of progressively larger diameters, continuing from the nucleus $o$ of the cluster to its boundary, and radial needles extending from ring to ring.

The crystalline effect may be varied by varying the concentration of monobrom-camphor or nitrocotton in the solution. Thus, if the concentration of monobrom-camphor in the solution prepared as hereinbefore described is raised to, say, 26 to 30 pounds, only radial lines will be present in each cluster and the rings will disappear entirely. If a solution having a somewhat lower concentration of monobrom-camphor, say 16 pounds, is employed, a combination effect of radial lines at the nucleus of the cluster and radial lines and rings at the boundary of the cluster will be produced. If, on the other hand, the concentration of nitrocellulose in solution is raised to about 16 to 17 pounds and the concentration of monobrom-camphor is maintained at 20 pounds, the ring effect will be enhanced and the well-defined lines between the cluster will become indistinct or disappear. In other words, a decrease in the relative concentration of cotton enhances the radial effect; whereas an increase enhances the ring effect. This phenomenon may be imputed to the fact that with a relative increase of cotton the viscosity of the solution is raised, and consequently crystallization is sufficiently resisted to effect an intermittent crystallization, resulting in discontinuous crystals and producing a wood-ring effect. On the other hand, when the viscosity of solution is low, a continuous crystallization producing an uninterrupted radial needle effect takes place. When a colored solution is employed, the color at the nucleus of each crystal cluster is somewhat darker, and is gradually and increasingly lighter toward its boundary, thus imparting a pleasingly variegated color effect to the coating.

Figure 1:
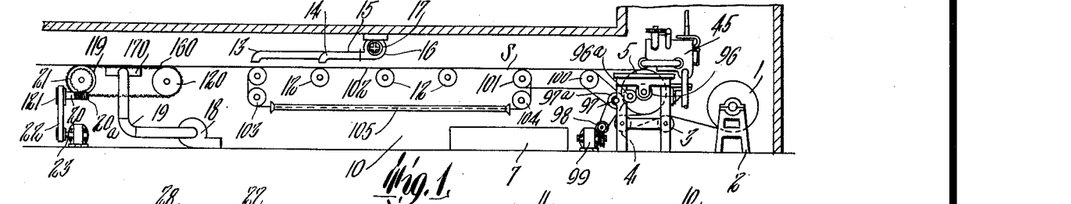
Figure 1 represents diagrammatically a side view of the cold room end of a machine for continuously coating paper or similar sheet material with the composition of this invention.

Referring to Figure 1 of the drawings, a roll of paper S is shown at 1, mounted for unwinding on spaced supports 2, 2' within a cold room 10. The paper is unwound from the roll and is successively brought over and under a pair of guide and tension rolls 3 and 4, respectively, rotatably mounted in the framework of the machine, and thence backwardly and over a large rotary roll 5, above which the coating device is supported. To permit a film of uniform thickness to be laid on the paper, the roll 5 is highly finished, so that the paper lies perfectly flat from side to side on its surface.

Figure 2:
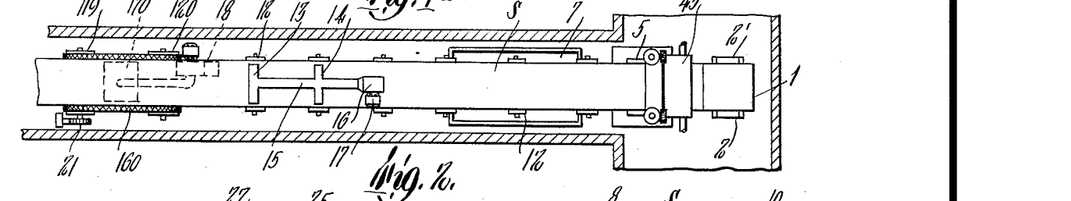
Figures 2 and 2ª, respectively, represent plan views of the cold and hot rooms.
Figures 2A, 3:
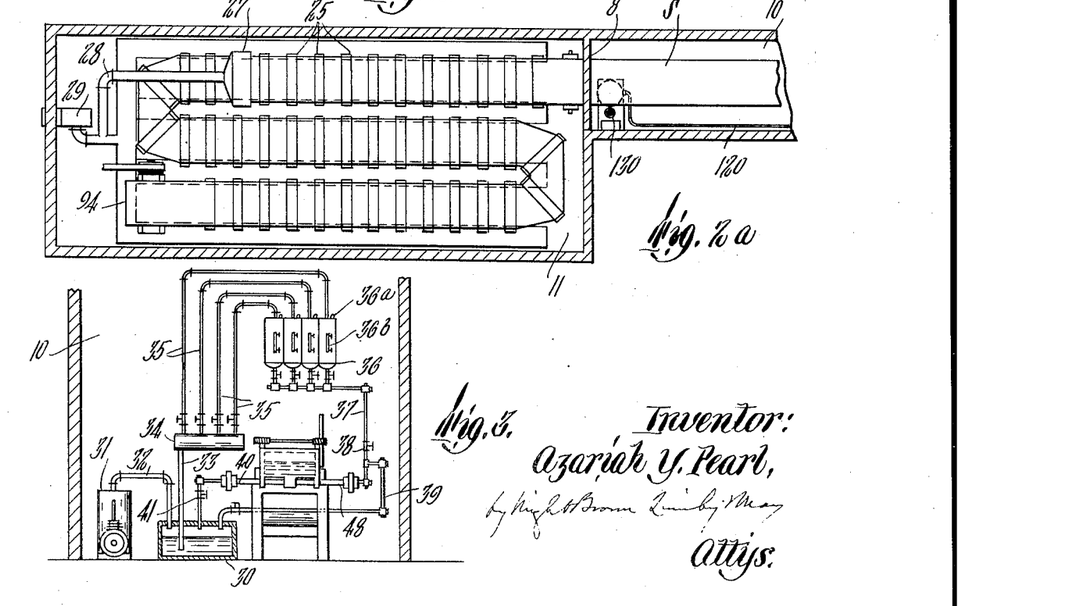
Figure 4:
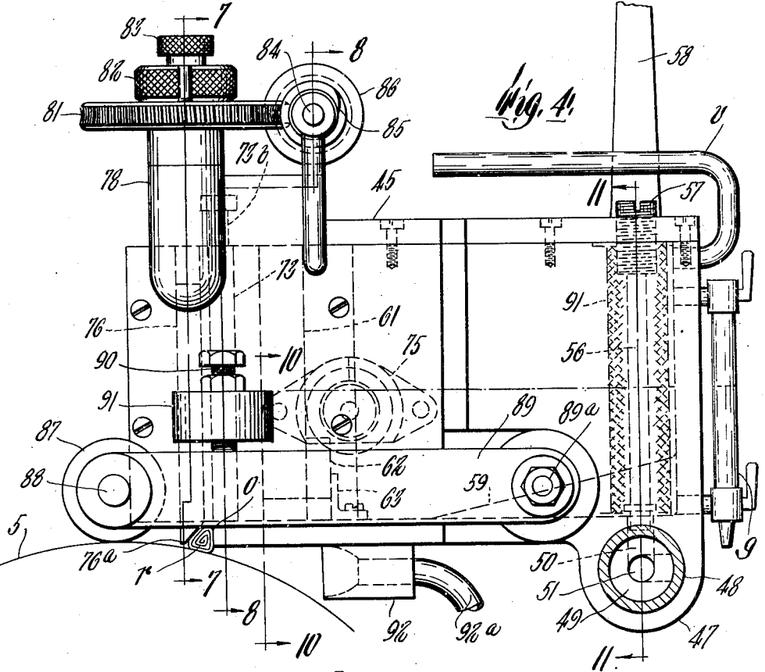
Figure 4 is a side view of the device.

Inasmuch as the solution is difficult to handle with pumps, due to the evaporation of the solvent and the consequent setting of the dissolved material, provision is made in this machine to deliver the solution to the coating device with compressed air. As shown, compressed air from a compressor 31 is forced through a pipe 32 above the solution level maintained in the closed supply tank 30, into which the prepared solution is delivered from a preparation tank (not shown). The solution is driven up through a pipe 33 into a manifold 34. A series of valved pipes 35 communicate with the manifold, each pipe leading into a container 36 serving for solutions of different colors, located above the coating device.

Each tank 36 may be equipped with a vent 36ª and also a gauge 36ᵇ, for ascertaining the height of solution therein. The solution is allowed to flow by gravity down through a pipe 37 from each tank and through a tube 48 into the coating device. The level of the solution in the device is maintained at a constant head by a valved overflow pipe 39, which discharges the overflow into the tank 30. The pipe line 37 is provided with a shut-off valve 38, which is closed when the device is to be drained, so that the solution may flow from the device through a pipe 40, valved as at 41, into the tank 30.

With this solution-feeding system, when one color is employed, the valves of the pipes 35 for the other colors are entirely shut off. This eliminates the necessity of cleaning of all the pipes 35, which are of considerable length, and all the containers 36 when a change of color is to be made. Cleaning may be effected by passing a solvent through the system. The cleaning solvent may be reutilized in making up a fresh solution of the particular color which it has acquired during its cleaning action. The pipe lines are preferably constructed with cross fittings at all turns, so that they may be supplied with removable plugs at their open end, the plugs being removed and the pipes cleaned with brushes if a setting of the nitrocellulose takes place within them.

Figure 5:
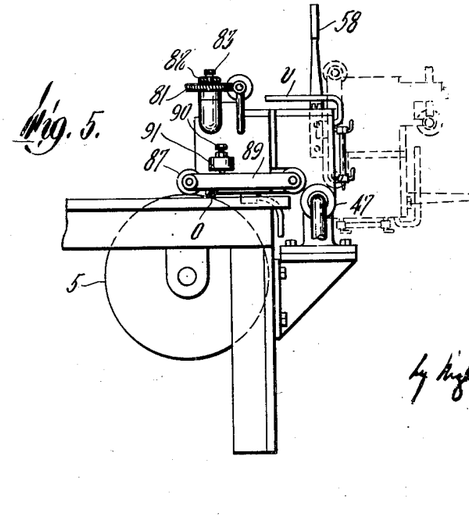
Figure 5 is a similar view, showing the device mounted on the machine.
Figure 6:
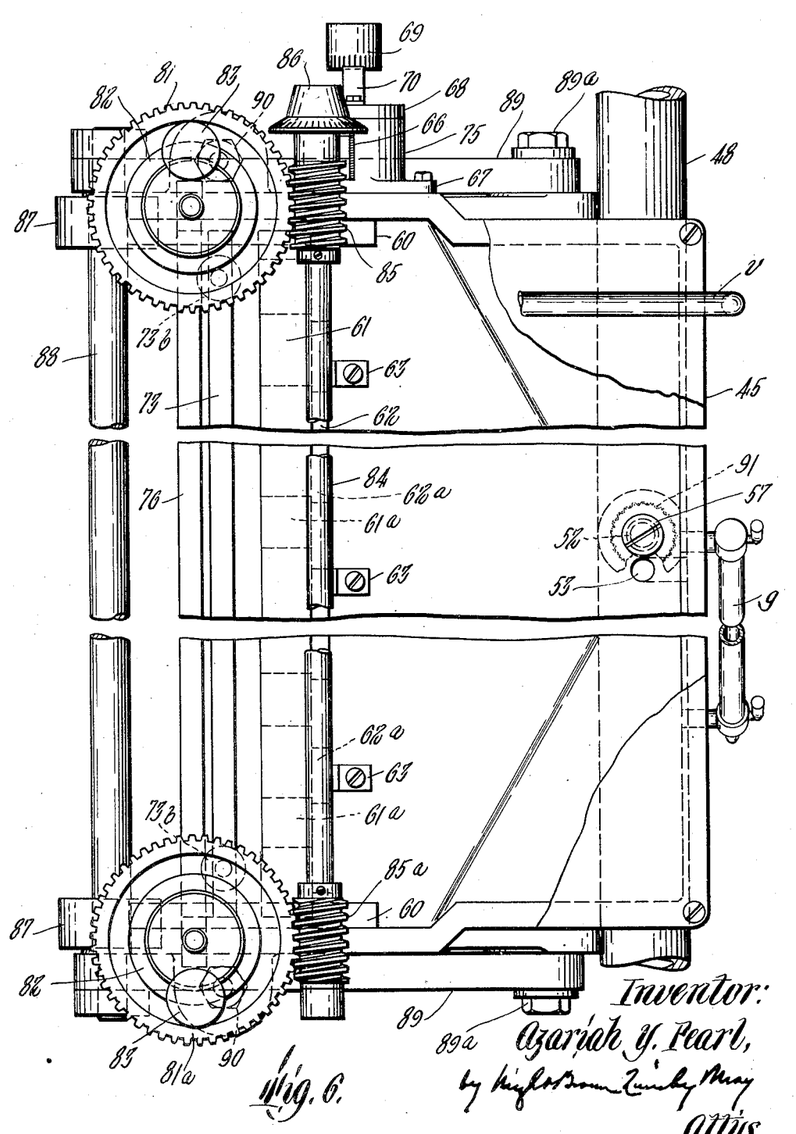
Figure 6 represents a plan view of the same.
Figures 10, 11, 12, 13, 14, 15:
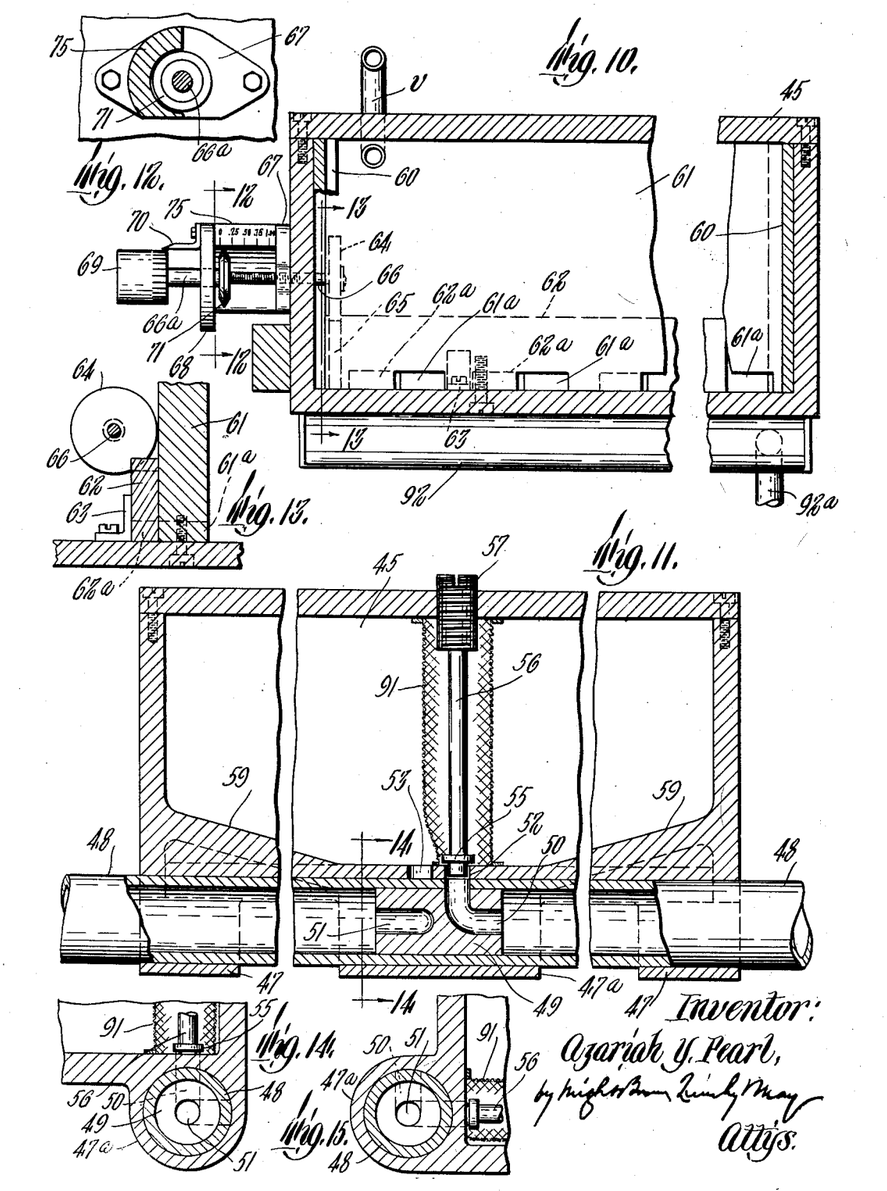
Figures 10 and 11 are sections on the lines 10—10 and 11—11, respectively, of Figure 4.
Figures 12 and 13 are sections on the lines 12—12 and 13—13 of Figure 10.
Figures 14 and 15 are sections on the line 14—14 of Figure 11, showing the coating device in operative and inoperative positions, respectively.

The coating device comprises a closed box designated as a whole as 45, for containing a supply of the solution, and having an outlet O at its bottom, through which the solution is discharged in a thin layer of substantially uniform, predetermined thickness. By this means, unnecessary loss of the solvent by evaporation, and also danger from fire, such as would occur if the solution were sprayed on by the use of compressed air, is in large measure averted. The box is hingedly supported at one end by spaced sleeve portions 47, 47ª through which the supply tube 48, which serves as a pintle, passes. The tube is externally finished so that the device may be easily swung thereabout, and is provided at the central knuckle 47ª with a plug 49 having solution inlet and outlet ports 50 and 51, respectively, formed through its ends and sides and which communicate through these ends with the interior of the tube and through its sides with openings through the side of the tube. Spaced inlet and outlet apertures 52 and 53, respectively, are formed through the bottom of the box at the central sleeve portion 47ª, permitting introduction of the solution into the device through the port 50 and draining of the solution from the box through the port 51. When the box is in horizontal operative position, shown in Figure 14, the inlet aperture 52 registers with the port 50, as shown, allowing the solution to pass into the box. The rate of flow into the box may be regulated by a valve 55 at the aperture 52. The valve, as shown, is on the lower end of a rod 56 threaded through the top of the box. By turning the portion 57 of the rod projecting above the box top, the valve may be raised or lowered so that the rate of flow through the aperture and past the valve into the box may be accurately governed. The solution flows through a tubular wire strainer 91, which extends from the bottom of the box to its top, so that any solid impurities contained therein are caught and retained on the wire. When draining of the device is desired, it is swung back 90° about its supply tube 48, by means of a handle 58 fixed to one of its sides, to its inoperative, vertical position shown in dotted lines in Figure 5 and in Figure 15. In so doing, the inlet aperture 52 through the box bottom is moved out of registry with the inlet port 50, and the outlet aperture 53 is alined with the outlet port 51, permitting the solution to drain by gravity from the box into the supply tank 30. To allow complete draining to be effected, the bottom of the box is preferably sloped or inclined at 59, 59 at its sides. The bottom of the box exteriorly is preferably provided with a trough 92 extending transversely thereof, so that when the box is swung to its inoperative vertical position, the trough catches any drip flowing down the outside of the bottom, and thus prevents such drip from reaching the roll 5 or paper thereon. This drip may be carried away by a pipe 92ª communicating with the bottom of the trough. Preferably, also, a sight gauge $g$ is provided at the back end of the box to permit the operator to ascertain the height of the solution in the box at any time when the box is in operative position. For maintaining atmospheric pressure within the box, a vent pipe $v$ is shown as extending from the back end of the box forwardly across its top to a sufficient distance, so that the box may be swung to its inoperative vertical position without escape of the solution at the open end of the pipe.

Provision is made to regulate the flow of solution from the box to produce a layer of predetermined thickness and width on the paper, preferably by a micrometer adjustment. To this end, secured internally to opposite sides of the box, are a pair of blocks 60, 60, which are channeled or grooved to receive the gates 61, 62, 73. The gates 61 and 62 may be relatively adjusted for regulating the rate of flow of the solution. As shown best in Figures 10 and 13, the gate 61 is stationary, being fixed against movement to the bottom of the box. At its lower edge portion it is provided with a series of openings or slots 61ª, spaced at regular intervals from one side of the box to the other. The gate 62 is somewhat shorter that the gate 61, approximately by the length of a slot 61ª, and is movable lengthwise, and it is maintained against the gate 61 and guided in its movement by an angle iron 63 secured to the bottom of the box. The gate 62 is also provided at its lower edge portion with a series of slots 62ª spaced at regular intervals. These slots are registerable in greater or less degree with the slots 61ª by lengthwise movement of the gate 62. Movement may be imparted thereto by axial movement of a shaft 66 passing through and threaded in a side of the box. The shaft is provided at its inner end with a disc 64 fixed thereto, engaging within a slot 65 cut in the gate 62. The shaft is threaded through one end 67 of a semi-cylindrical casing 75, fixed externally to the side of the box, and passes through and is journalled at its enlarged, unthreaded outer portion 66ª in the other end 68 of the casing. Fixed to the unthreaded end 66ª is a knob or dial 69, rotatable by hand and having graduations marked thereon. A pointer 70 fixed to the end 68 of the casing cooperates with the graduations to indicate the angular position of the dial at any time. Fixed on the shaft between the ends 67 and 68 of the casing, is a knife-edged disc 71 in reading relation to a scale arranged parallel to the shaft and located at the upper edge of the casing. This disc travels axially with the rotation of the shaft by the dial 69, and indicates the axial position of the shaft and thus the amount of registry between the gate slots, accurate fractional parts of the scale units being ascertainable by the points 70 and the dial graduations. Thus by providing the shaft with 40 threads per inch and the dial 69 with 25 graduations, it will be seen that by turning the dial one graduation the disc 71 and similarly the gate 62 moved thereby have been caused to travel 1/1000 of an inch. Consequently, very accurate adjustments of the rate of flow of the solution may be made. The maximum amount of registry of the gate slots and the maximum rate of flow occurs when the disc is moved to the end 67 of the casing, these values diminishing as it is moved toward the end 68.

The solution flows through the portions of the slots brought into registry, in a series of uniform streams, over the bottom of the box, which is extended beyond the gates, the streams diverging or spreading thereon and joining with one another to form a continuous layer. The thickness of the layer will depend, of course, upon the size of the several streams, which may be varied by varying the amount of registry between the gate slots.

This layer flows under the lower edge of the third gate 73 extending from one side of the box to the other. Provision is made to obstruct the flow under the gate 73 at both ends thereof to produce a film of predetermined width. As shown, a slot 73ª is formed inwardly of each of the ends of the gate 73 to define oppositely extending tongue portions 730, about which fabric $f$ or other suitable material of the desired width and thickness is wound in successive convolutions. The fabric at the bottom edge of the gate rests on the bottom of the box and prevents flow of the film thereunder. The lower edge portion of the gate between the obstructed ends smooths out any marked unevenness in the continuous layer as it passes thereunder. The gate 73 is vertically movable in its channels in the blocks 60 and is provided with lifting knobs 73$^b$, threaded into its upper edge portion, so that when the top of the box edge is removed, the knobs may be grasped to lift the gate out of the box for cleaning or for the renewal of the fabric.

Figures 7, 8, 9:
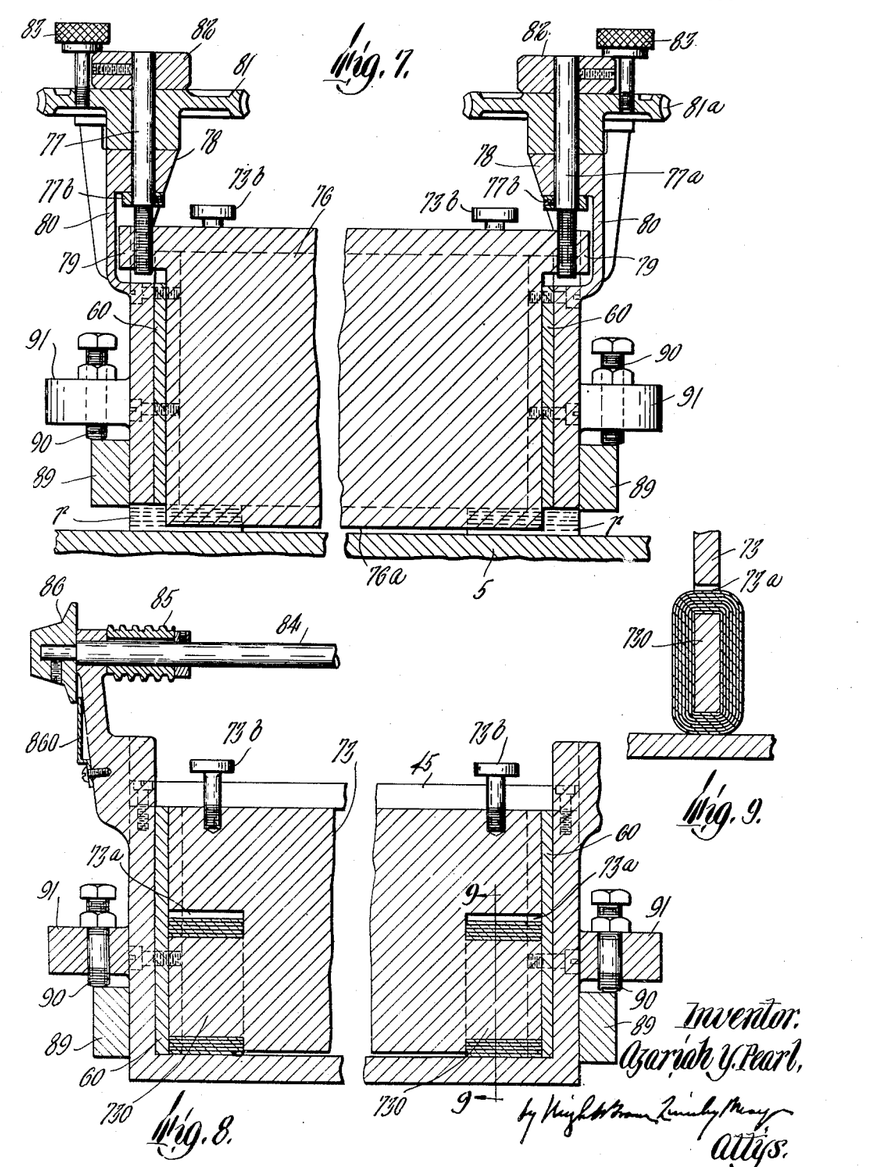
Figures 7 and 8 are sections on the lines 7—7 and 8—8, respectively, of Figure 4.
Figure 9 is a section on the line 9—9 of Figure 8.

The solution flows as a continuous layer of predetermined thickness and width through the slot outlet O in the box bottom beyond the gate 73 on to the paper as it passes at a predetermined rate over the large roll 5. To distribute the solution properly on the paper, as well as to smooth out any surface irregularities therein, the device is provided with a doctor 76 (Figures 4 and 7) provided with a lower knife edge 76$^a$. To prevent the solution from streaming out laterally of the ends of the opening O, obstructions, such as small rolls $r$, formed from fabric, may be placed thereat on the roll 5 between the lower edge of the doctor and the edge of the box bottom, the rolls wiping along the surface of the roll 5 as it is rotated, and being held in position by adjacent parts of the box and the roll face.

The doctor is adjustable to the desired degree above the paper, being guided within ways in the blocks, 60, 60 for such adjustment. It is supported at both ends at its upper edge portion by a pair of vertical shafts 77 and 77$^a$, each journaled for rotation in a bearing 78 afforded by an upstanding bracket 80 fixed to the sides of the box. Each shaft is threaded through a lug 79 provided at the corresponding end of the doctor, so that rotation of the shafts imparts upward or downward movement of the doctor. To effect such rotation, the shafts 77, 77$^a$ are respectively provided with worm gears 81, 81$^a$ loosely mounted thereon and resting on the bearings 78. To prevent translatory motion of the shafts 77, 77$^a$, a collar 77$^b$ is fixed to each at the lower end of the bearing 78. Fixed to each shaft and bearing on its respective worm gear is a knob 82, which is normally clamped down to its gear 81 by a thumb screw 83 threaded into its gear and turned down so that the under face of its head engages the upper face of the knob 82, whereby when its gear is rotated the roll 82 and its shaft are rotated therewith. Simultaneous rotation of the gears 81, 81$^a$ and a corresponding raising or lowering of the doctor may be effected by a worm shaft 84, provided with the worms 85, 85$^a$ meshing respectively with the worm gears 81, 81$^a$. Either end of the doctor may be adjusted independently by releasing the screw 83 at one end so that the shaft at that end may be rotated independently of the shaft at the other end. Rotation of the shaft 84 may be effected by turning a graduated knob 86 fixed to one end thereof and with the graduations of which a suitable pointer 86$^a$ cooperates. The doctor thus may be accurately adjusted at either or both ends by thousandths of an inch, so that its knife edge may be caused properly to distribute and smooth down the layer of solution flowed on to the paper.

The box is supported at its outlet end at each side on the roll 5 beyond the edges of the paper by a roller 87 journaled for rotation on the corresponding end of a shaft 88 extending from one side of the box to the other. The shaft 88 is fixed at each end to the outer end of a lever arm 89 pivotally secured at its opposite end as at 89$^a$ to a side of the box. The box is adjustable up and down relative to its lever arms 89, to regulate the clearance for papers of different thicknesses passing under the box. To this end, on each side of the box, there is provided an adjusting screw 90 threaded through a lug 91 projecting from the side of the box. The lower end of the adjusting screw bears against the arm 89 and may be turned to raise or lower the box slightly as may be desired.

The device thus deposits a layer of the coating solution of substantially uniform and predetermined thickness and width over the upper surface of the paper. The coating deposited is very thin, so that the crystals subsequently formed lie in a single layer therein and may be driven off. If a film of too great thickness is applied, a "padding" or piling up of the crystals results, and the expulsion of the crystals is rendered difficult and a less pronounced crystalline appearance is produced in the product. To yield an optimum crystalline effect, the film as applied preferably is approximately .005 to .008 inches in thickness. When cured and set the film shrinks to a thickness of about .001 inches. A control of the thickness of film to thousandths of an inch may be effected readily by the coating device constructed as hereinbefore described.

The coated paper passes substantially horizontally from the roll 5 over table rolls 12 closely adjacent to the surface of water maintained in tanks 7. The uncoated face of the paper is thus subjected to moist air, which serves to counterbalance the tendency of the paper to curl owing to the solvent in the coating on its upper face. If desired, the rolls 12 may be arranged on a slight camber to cause a distortion of the crystals from natural formation. Various crystalline appearances are possible by varying the arrangement of the rolls. The roll 5 and the table rolls 12 may be driven at the same rate of speed by any suitable means to aid in effecting a propulsion of the paper thereover and the unwinding of the paper from the roll 1. As shown, the roll 5 is geared at one end 96, through an idle gear 96ª to a gear (not shown) fixed to a driving shaft 97. The shaft 97 is provided with a pulley 97ª, which is belted to a driving pulley 98ª of a speed reduction unit 98 for a motor 99. The first table roll 12 adjacent to the roll 5 is provided with a driving pulley 100 at one end, which is belted to a pulley 101 on the driving shaft 97. The first roll is also belted to a pulley 101 on the end of the second roll 12, to drive it at the same rate of speed. The second roll is provided with a sprocket at one end thereof, over which a chain 102 passes forwardly to drive similar sprockets fixed to the corresponding ends of the remaining table rolls 12, at the same rate of speed. The chain passes downwardly from the last roll 12 over the idle sprocket 103, thence backwardly through a tube or pipe 105, which serves as a guard, over a similar idle sprocket 104, and finally upwardly over the sprocket on the first roll.

The paper may be maintained at a substantially fixed and relatively low temperature during the crystallization which takes place in the coating, to prevent rapid evaporation of solvent. If rapid evaporation of solvent were permitted, large crystals would not be given sufficient time to form, small crystals being produced. The freshly coated paper is then caused to pass through the cold room. If the atmosphere of the cold room is maintained at relatively low temperature, say, about 50° to 60° F., the formation of relatively large crystal groups is favored. The atmosphere of the room may be maintained at the desired temperature by circulating a suitable refrigerant through pipes 120 positioned alongside the walls of the room adjacent to the machine. The refrigerant warmed in the pipes 120 may be compressed and condensed in a compressor shown at 130 and returned and expanded in the pipes. To promote crystallization the coating is preferably slightly disturbed from its state of quiescence by air blown gently against its surface. This produces a gentle excitation in the coating, so that crystal inoculation is initiated. The crystal-clusters grow from a nucleus to the size of a pea in a 10-foot travel, the paper progressing at a rate of about 10 to 20 feet per minute. Crystallization into clusters of considerable size is effected in a 30-foot travel at this speed. As shown, the room air is delivered against the coating from nozzles 13 and 14, which communicate through a common conduit 15 with a fan blower 16 driven as by a motor 17.

The sheet is again propelled or driven and further aided in unwinding from the roll 1 by passage over and in contact with an endless driving apron or belt 160, made of rubber, fabric, or the like. The apron is perforated and passes over a suction box 170 maintained under suction by an exhaust fan 18 communicating with the box through a conduit 19. The paper is drawn against the apron by the suction, so that as the apron is driven the paper is carried along therewith by friction. The apron may be driven as by rotation of either of a pair of rolls 119, 120, about which it passes. As shown, the roll 119 is rotated through a worm gear 21, fixed to one of its ends by a worm 20ª on the end of a worm shaft 20. The shaft 20 may be driven by a pulley 121, over which a driving belt 22 from a motor pulley 23 passes. A drive such as described propels the paper with little vibration, so that a state of quiescence which favors the growth of large crystals may be preserved during crystallization. The apron is driven at a rate of speed somewhat higher than that at which the roll 5 and the table rolls 12 are driven, to produce a steady tension on the paper, smoothing it and preventing wrinkling or "bunching" of the paper at the apron. In practical operation in one commercial machine the paper travels about 120 feet in the cool room, during which time setting of the coating and complete crystallization is effected. The paper is 30 inches in width, and the propelling stretch of the apron is 5 feet long. These dimensions, it should be understood, are of an actual installation and are given by the way of example only.

Figure 1A:
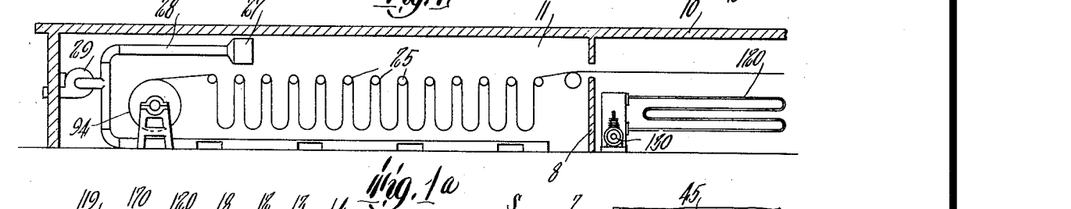

After crystallization, the paper is passed into the curing or hot room 11 through a slot in a partition 8 (Figures 1ª and 2ª) between the cold and hot rooms where the crystals are released from the coating by heat. As shown in Figure 1ª the paper is festooned or looped as it passes into the hot or curing room, the looping mechanism herein conventionally shown being a "Stubbs looper." Each loop is supported by a roll or rod 25, and is slowly carried along in reversely extending lanes or rows, through the curing room, the cured paper product finally being wound upon a roll 94. During the curing operation, the coating is exposed to the atmosphere of the room, which is maintained at a temperature of about 100° to 120° F., thus effecting an expulsion of the monobrom-camphor crystals by volatilization or sublimation thereof. Furthermore, any solvent which may not have evaporated during crystallization is expelled. During operation, the interior wall surfaces of the curing room become coated with monobrom-camphor crystals, which may be recovered and re-employed in making up the coating solution. Circulation of air in the curing room may be maintained by exhausting the air therefrom through a head 27 communicating through a conduit 28, with an exhaust or suction fan 29. The air exhausted from the room may be treated for the recovery of solvent and crystallizing compound contained therein.

Traces of the crystallizing material may remain in the coating after treatment in the curing room, this being noticeable by the camphor odor which the paper possesses, but this gradually disappears as the paper ages and curing becomes completed. Where the paper is employed as wall paper or for decoratively lining trunks or drawers, however, a residual amount of monobrom-camphor may advantageously be allowed to remain therein, so that it may serve to repel certain bacteria and insects.

A complete curing of the coating may be accelerated by treating the film with a monobrom-camphor solvent which does not attack the nitrocellulose. Thus if the coating is treated with carbon tetrachloride prior to curing, the carbon tetrachloride dissolves a portion of the crystals and is volatilized therewith during the curing operation, assisting in effecting a complete curing of the film. If desired, the paper to which the coating is applied may be colored to offer a contrasting background to the coating. For example, a pink-colored background and a colorless coating gives the nucleus of each crystal-simulating cluster a distinct pink tint, variable towards its boundaries.

If the base is coated by spraying the solution thereon, the volatile solvent is rapidly evaporated and ample time for large crystal formation is not allowed. In such case, small crystals only are produced. Where a base such as leather, rubber, bakelite, wood, etc., is to be coated, the base may be dipped into a solution of suitable viscosity, and then allowed to drain until a coating of the proper thickness remains. Subsequent crystallization and curing brings out its crystalline appearance.

When such material as paper, cloth, leather, or the like, is coated, the solution penetrates the surface portion thereof, so that the coating becomes partially embedded therein. As shown in Figure C, the coating $f$ is partially embedded in the surface portion of the paper $b$.

For coating such material as leather, a solution of monobrom-camphor in amyl acetate may be advantageous, due to the fact that larger crystal-simulating clusters having more sheen are produced. This is due to the fact that crystallization from amyl acetate requires a longer time than from solvent L, due to the lower volatility of the amyl acetate.

When the coating is deposited on a smooth, impermeable base, such as glass or metal, it may be stripped off in a continuous, coherent condition. The stripping may be facilitated by first immersing the base in hot water. This produces unequal expansion of the base and the coating and permits the coating to be stripped off in a continuous, coherent film with relative ease. The stripped film, if desired, may then be united with a suitable base by an adhesive. It may, for example, be applied to a base such as glass, and serve as a background for printing.

In lieu of nitrocellulose, I may employ other coating materials, such as a gum or wax which will form a film and which is soluble in the same solvent in which the crystal-forming substance is dissolved. A similar effect may be produced as with nitrocellulose, though it may lack something of the beautiful silky or satiny appearance incident to the use of nitrocellulose.

Having thus described this invention, it should be obvious that it is capable of various changes and modifications without departing from its spirit or scope as defined by the appended claims.

What I claim is:

1. A base material coated with nitrocellulose having a crystalline configured intaglio.

2. A nitrocellulose film having an intaglio of monobrom-camphor crystals.

3. A base material coated with nitrocellulose having an intaglio of monobrom-camphor crystals.

4. A base material coated with a continuous, coherent coating of nitrocellulose having an intaglio of adjacent radiating crystal clusters of various sizes and configurations therein.

5. A base material coated with a continuous, coherent coating having an intaglio of adjacent crystal clusters, each of said clusters having the appearance of a transverse section through wood.

6. A base material coated with a continuous, coherent coating of nitrocellulose having an intaglio of adjacent radiating crystal clusters, each of said clusters comprising rings of progressively larger diameters and radial needles extending from ring to ring.

7. A foundation or base surfaced with a cellulose derivative having a crystalline configured intaglio.

8. A process which comprises dissolving a cellulose derivative together with a crystallizable compound in a common solvent, coating a base with the solution, evaporating the solvent, thereby causing a crystallization of the compound and a setting of the coating, and then heating the product to expel the crystals.

9. A process which comprises dissolving nitrocellulose together with crystallizable compound in a common solvent, coating a base with the solution, evaporating the solvent, thereby causing a crystallization of the compound and a setting of the coating, and then removing the crystallized compound.

10. A process which comprises dissolving nitrocellulose together with monobrom-camphor in a common solvent, coating a base material with the solution, evaporating the solvent, thereby effecting a crystallization of the monobrom-camphor and a setting of the coating, and then treating the product to remove the monobrom-camphor crystals.

11. A process which comprises applying a thin, substantially uniform coating of a solution of nitrocellulose and a crystallizable compound to a base material, evaporating the solvent to cause a setting of the coating and a crystallization of the compound therein, and then treating the product to expel the crystals therefrom.

12. A process which comprises applying a thin, substantially uniform coating of a solution of nitrocellulose and a crystallizable compound to a base material, evaporating the solvent to cause a setting of the coating and a crystallization of the compound therein, treating the product with a solvent of the crystallizable compound only, and then treating the treated product to expel the crystals therefrom.

13. A process which comprises applying a thin, substantially uniform coating of a solution of nitrocellulose and monobrom-camphor to a base material, evaporating the solvent to cause a setting of the coating and a crystallization of the monobrom-camphor therein, treating the product with carbon tetrachloride, and then removing the crystals therefrom.

14. A process which comprises applying a thin, substantially uniform coating of a solution of nitrocellulose and a crystallizable compound in a volatile solvent to a base, allowing the solvent to evaporate therefrom at relatively low temperature, thereby effecting a setting of the coating and a crystallization of the compound, and then treating the product to expel the crystals therefrom.

15. A process which comprises applying a thin, substantially uniform coating of a solution of nitrocellulose and monobrom-camphor in a volatile solvent to a base, allowing the solvent to evaporate therefrom at about 58° to 60° F., and then heating the product to about the subliming temperature of the monobrom-camphor crystals.

16. A process which comprises applying a thin, substantially uniform film of about .005 to .008 inches of thickness of a solution of nitrocellulose and a crystallizable compound to a base material, allowing the solvent to evaporate therefrom to effect a setting of the coating and a crystallization of the compound therein, and then treating the product to expel the crystals therefrom.

17. A continuous process which comprises continuously applying a substantially uniform, thin coating of a solution of nitrocellulose and a crystallizable compound to a continuously progressing sheet, maintaining the sheet at relatively low temperature during evaporation of the solvent while setting of the coating and crystallization of the compound therein takes place, and after crystallization maintaining the sheet at an elevated temperature to effect expulsion of the crystals therefrom.

18. A continuous process which comprises continuously applying a thin, substantially uniform coating of nitrocellulose and a crystallizable compound to a continuously progressing sheet, maintaining the sheet at relatively low temperature during evaporation of the solvent while setting of the coating and crystallization of the compound therein takes place, and after crystallization gathering the continuously progressing sheet in loops and maintaining the loops at a temperature sufficiently high to effect expulsion of the crystals.

19. A continuous process which comprises continuously applying a thin, substantially uniform coating of a solution of nitrocellulose and a crystallizable compound to a face of a continuously progressing sheet, maintaining the sheet at relatively low temperature during evaporation of the solvent while setting of the coating and crystallization of the compound takes place, subjecting the uncoated face of the sheet to a moist atmosphere during crystallization, and after crystallization maintaining the sheet at an elevated temperature to effect expulsion of the crystals therefrom.

20. A continuous process which comprises continuously applying a thin, substantially uniform coating of nitrocellulose and a crystallizable compound to a face of a continuously progressing sheet, producing an excitation in the coating to initiate crystallization of the compound, maintaining the sheet at relatively low temperature during evaporation of the solvent while setting of the coating and crystallization takes place, and after crystallization maintaining the sheet at an elevated temperature to effect expulsion of the crystals therefrom.

21. A continuous process which comprises continuously applying a thin, substantially uniform coating of a solution of nitrocellulose and a crystallizable compound to a continuously progressing sheet, delivering air on the coating to promote crystallization of the compound, maintaining the sheet at relatively low temperature during evaporation of the solvent while setting of the coating and crystallization takes place, subjecting the under surface of the sheet to a moist atmosphere during crystallization, and after crystallization maintaining the sheet at an elevated temperature to effect expulsion of the crystals therefrom.

22. A process which comprises applying a thin, substantially uniform coating of a solution of nitrocellulose and a crystallizable compound to an impermeable, smooth base, allowing the solvent to evaporate therefrom at relatively low temperature, thereby effecting a setting of the coating and a crystallization of the compound therein, heating the product to expel the crystals therefrom and then stripping the coating from the base in the form of a continuous, coherent film.

23. A process which comprises applying a thin, substantially uniform coating of a solution of nitrocellulose and a crystallizable compound to an impermeable, smooth base, allowing the solvent to evaporate therefrom at relatively low temperature, thereby effecting a setting of the coating and a crystallization of the compound therein, heating the product to expel the crystals therefrom, loosening the coating from the base, and then stripping the coating from the base in the form of a continuous, coherent film.

24. A process which comprises applying a thin, substantially uniform coating of a solution of nitrocellulose and a crystallizable compound to an impermeable, smooth base, allowing the solvent to evaporate therefrom at relatively low temperature, thus effecting a setting of the coating and a crystallization of the compound therein, heating the product to expel the crystals therefrom, immersing the product in hot water, and then stripping the coating from the base in the form of a continuous, coherent film.

25. A process which comprises applying a solution of nitrocellulose and a crystallizable compound to a base material, evaporating the solvent to effect a setting of the coating and a crystallization of the compound therein, and treating the product with a solvent of only the crystallizable compound.

26. A process which comprises applying a solution of nitrocellulose and a crystallizable compound to a base material, allowing the solvent to evaporate so as to effect a setting of the nitrocellulose and a crystallization of the compound, and removing the crystals from the product.

27. A process which comprises applying a solution of nitrocellulose and a crystallizable compound to an impermeable, smooth base, allowing the solvent to evaporate so as to effect a setting of the nitrocellulose and a crystallization of the compound, removing the crystals, and stripping the nitrocellulose from the base in the form of a continuous, coherent film.

In testimony whereof I have affixed my signature.

AZARIAH Y. PEARL.